United States Patent
Bai et al.

(10) Patent No.: US 12,019,329 B2
(45) Date of Patent: Jun. 25, 2024

(54) BACKLIGHT MODULE AND QUANTUM DOT DISPLAY DEVICE

(71) Applicant: Shenzhen China Star Optoelectronics Semiconductor Display Technology Co., Ltd., Guangdong (CN)

(72) Inventors: Xue Bai, Guangdong (CN); Song Lan, Guangdong (CN); Miao Zhou, Guangdong (CN); Dongze Li, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 304 days.

(21) Appl. No.: 17/295,466

(22) PCT Filed: Apr. 30, 2021

(86) PCT No.: PCT/CN2021/091484
§ 371 (c)(1),
(2) Date: May 20, 2021

(87) PCT Pub. No.: WO2022/222181
PCT Pub. Date: Oct. 27, 2022

(65) Prior Publication Data
US 2022/0357618 A1 Nov. 10, 2022

(30) Foreign Application Priority Data
Apr. 22, 2021 (CN) .......................... 202110435280.9

(51) Int. Cl.
*G02F 1/13357* (2006.01)
*G02F 1/1335* (2006.01)

(52) U.S. Cl.
CPC .. *G02F 1/133603* (2013.01); *G02F 1/133605* (2013.01); *G02F 1/133606* (2013.01); *G02F 1/133614* (2021.01)

(58) Field of Classification Search
CPC ......... G02F 1/133603; G02F 1/133605; G02F 1/133606; G02F 1/133614; G02F 1/133528; H01L 25/0753; H01L 33/48; H01L 33/50
See application file for complete search history.

(56) References Cited

U.S. PATENT DOCUMENTS

| | | | |
|---|---|---|---|
| 2005/0185113 A1 | 8/2005 | Weindorf et al. | |
| 2014/0077247 A1* | 3/2014 | Hikmet | F21K 9/60 257/98 |
| 2022/0113590 A1* | 4/2022 | Wang | G02F 1/133607 |

FOREIGN PATENT DOCUMENTS

| | | |
|---|---|---|
| CN | 103700756 A | 4/2014 |
| CN | 104298001 A | 1/2015 |

(Continued)

OTHER PUBLICATIONS

Machine translation of CN-208000936-U (Year: 2018).*
Machine translation CN 110275349 A (Year: 2019).*

*Primary Examiner* — Anne M Hines
*Assistant Examiner* — Jose M Diaz
(74) *Attorney, Agent, or Firm* — Rivka Friedman

(57) ABSTRACT

The present application provides a backlight module and a quantum dot display device. The present application improves energy efficiency by modifying a backlight of the quantum dot display device. Specifically, energy efficiency of a light-emitting element is improved by adding a small amount of phosphors in the backlight module or setting a diffuser plate as a transparent diffuser plate. In addition, the quantum dot display device provided by the present appli- (Continued)

cation not only has a backlight device, but also has a quantum dot film layer and a polarizer.

10 Claims, 2 Drawing Sheets

(56) References Cited

FOREIGN PATENT DOCUMENTS

| | | | | |
|---|---|---|---|---|
| CN | 104483778 | A | | 4/2015 |
| CN | 105204226 | A | | 12/2015 |
| CN | 107656399 | A | | 2/2018 |
| CN | 208000936 | U | * | 10/2018 |
| CN | 208506440 | U | | 2/2019 |
| CN | 110275349 | A | * | 9/2019 ............... F21K 9/64 |
| CN | 110579905 | A | | 12/2019 |
| CN | 102466170 | A | | 5/2021 |
| WO | 2015030036 | A1 | | 3/2015 |

* cited by examiner

BACKLIGHT MODULE AND QUANTUM DOT DISPLAY DEVICE

BACKGROUND OF INVENTION

Field of Invention

The present disclosure relates to the field of backlight display technology, in particular to a backlight module and a quantum dot display device.

Description of Prior Art

At present, quantum dot (QD) material becomes the most excellent luminescent material in the 21st century due to its excellent properties, such as high color purity and continuous adjustable spectrum, which can greatly improve color performance in a display color gamut of existing LCDs. Therefore, its display applications have been widely studied in recent years. An existing quantum dot liquid crystal display panel (QD-OC) has advantages of large viewing angles and a high color gamut. The viewing angles of mass-produced ordinary LCD TVs currently on the market are about 60°, and the viewing angles of quantum dot TVs are about 80°. In the prior art, a quantum dot layer is introduced on a polarizing layer on a side of a thin film transistor array substrate and attached to an outer side of the polarizing layer (QD-POL) to increase the viewing angles to more than 120°. However, it is difficult to meet requirements of an ideal high color gamut, wide viewing angles, and high energy efficiency due to low excitation efficiency.

SUMMARY OF INVENTION

The backlight module and quantum dot display device provided by the present disclosure have a high color gamut, wide viewing angles, and high energy efficiency.

In order to solve the above problems, the technical solution provided by the present disclosure is as follows:

The present disclosure provides a backlight module, including:
  a light-emitting element which emits blue light; and
  a color conversion layer including a phosphor, wherein the phosphor emits at least one of red light, green light, or yellow light under excitation of blue light.

In an optional embodiment of the present disclosure, a weight percentage of the phosphor in the color conversion layer is 0.05 wt % to 0.5 wt %.

In an optional embodiment of the present disclosure, the phosphor is made of a material including a rare earth phosphor or a calcium halophosphate phosphor activated by antimony and manganese.

In an optional embodiment of the present disclosure, the color conversion layer is an encapsulation layer covering the light-emitting element.

In an optional embodiment of the present disclosure, the color conversion layer further includes a sealant layer, the sealant layer at least partially covers the light-emitting element, and the phosphor is evenly dispersed in the sealant layer.

In an optional embodiment of the present disclosure, the backlight module further includes:
  a substrate, wherein the light-emitting element is formed on the substrate; and
  a reflective sheet located on an upper surface of the substrate and adjacent to the light-emitting element, wherein the color conversion layer is located on a surface of the reflective sheet away from the substrate.

In an optional embodiment of the present disclosure, the backlight module further includes a diffuser plate located on a side of a light-exiting surface of the light-emitting element, and the color conversion layer is formed on a surface of the diffuser plate.

In an optional embodiment of the present disclosure, a plurality of protrusions are formed on a surface of the color conversion layer away from the diffuser plate.

In an optional embodiment of the present disclosure, the diffuser plate is a transparent diffuser plate with a transmittance greater than 90%.

A second aspect of the present invention provides a quantum dot display device, wherein the quantum dot display device includes a backlight module, and the backlight module includes:
  a light-emitting element which emits blue light;
  a color conversion layer including a phosphor, wherein the phosphor emits at least one of red light, green light, or yellow light under excitation of blue light; and
  a display panel located on a side of a light-exiting surface of the backlight module, wherein the display panel includes a quantum dot layer.

In an optional embodiment of the present invention, the display panel further includes a polarizer, and the quantum dot film layer is formed on the polarizer.

Beneficial effects of the present disclosure are that: on the one hand, the present disclosure adds a small amount of phosphors in the backlight module that can convert part of blue backlight into red, green, or yellow light under an excitation of the blue backlight, and since brightness of red, green, or yellow light perceived by human eyes is greater than that of blue light under the same power, an energy efficiency of a light-emitting element can be improved; and on the other hand, a diffuser plate of the backlight module is set as a transparent diffuser plate, thereby increasing transmittance of the backlight, reducing loss of the backlight, and improving the energy efficiency of the light-emitting element. In the present disclosure, the energy efficiency can be increased by 10%-30%.

BRIEF DESCRIPTION OF DRAWINGS

The following describes the specific implementations of the present application in detail with reference to the accompanying drawings, which will make the technical solutions and other beneficial effects of the present application obvious.

DETAILED DESCRIPTION OF PREFERRED EMBODIMENTS

Figure 1:
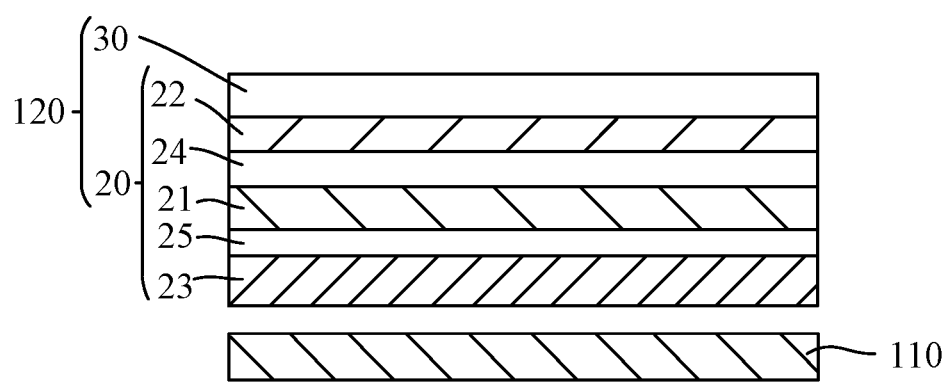
FIG. 1 is a schematic diagram of a quantum dot display device provided by the present disclosure.

The technical solutions in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. Based on the embodiments of the present disclosure, all other embodiments obtained by those skilled in the art without creative work shall fall within the protection scope of the present disclosure.

In the description of this application, it should be understood that the terms "center", "longitudinal", "transverse", "length", "width", "thickness", "upper", "lower", "front", "Rear ", "left", "right ", "vertical", "horizontal", "top", "bottom", "inside", "outside", "clockwise", "counterclockwise", and the like are based on the orientation or positional relationship shown in the drawings, and is merely for the convenience of describing the present invention and simplifying the description, rather than indicating or implying that the device or element referred to must have a specific orientation, structure and operation in a specific orientation, which should not be construed as limitations on the present invention. In addition, the terms "first" and "second" are used for descriptive purposes only, and cannot be understood as indicating or implying relative importance or implicitly indicating the number of technical features indicated. Therefore, the features defined as "first" and "second" may explicitly or implicitly include one or more of the features. In the description of the present application, the meaning of "a plurality" is two or more, unless specifically defined otherwise.

The present disclosure may repeat reference numbers and/or reference letters in different implementations. Such repetition is for the purpose of simplification and clarity, and does not indicate the relationship between the various embodiments and/or settings discussed.

The present disclosure is directed to solving the technical problem of low energy efficiency of the existing quantum dot display device by adding a small amount of at least one of red, green, or yellow phosphors to a backlight module or setting a diffuser plate as a transparent diffuser plate, thereby improving energy efficiency of the quantum dot display device.

The backlight module and quantum dot television device of the present disclosure will be described in detail below in conjunction with specific embodiments.

Figure 2:
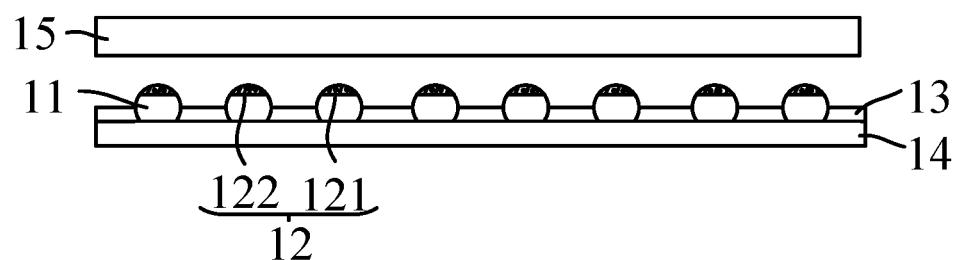
FIG. 2 is a schematic diagram of a backlight module provided by Embodiment 1 of the present disclosure.

Referring to FIGS. 1-2, Embodiment 1 of the present disclosure provides a quantum dot display device 100. The quantum dot display device 100 includes a backlight module 110 and a display panel 120. The backlight module 110 faces the display panel 120.

Specifically, referring to FIG. 2, the backlight module 110 includes at least one light-emitting element 11, at least one color conversion layer 12, a reflective sheet 13, and a bottom plate 14.

The light-emitting element 11 is a blue light-emitting element. In an optional embodiment of the present disclosure, the light-emitting element 11 is a blue-backlight light-emitting diode.

In this embodiment, the color conversion layer 12 is an encapsulation layer covering the light-emitting element 11. The color conversion layer 12 includes a small amount of phosphors 121, which emit at least one of red light, green light, or yellow light under excitation of blue light. In other words, the phosphor 121 may be at least one of red phosphor, green phosphor, or yellow phosphor. Specifically, a material of the phosphor 121 may be at least one of a rare earth phosphor such as yttrium aluminum garnet (YAG) or a calcium halophosphate phosphor activated by antimony and manganese.

In an optional embodiment of the present disclosure, a weight percentage of the phosphor 121 in the color conversion layer 12 is 0.05 wt %-0.5 wt %.

Since brightness of red, green, or yellow light perceived by human eyes is greater than that of blue light under the same power, adding a small amount of red phosphor, green phosphor, or yellow phosphor to the backlight module can increase a light output rate and improve energy efficiency of the light-emitting element. In the present disclosure, the energy efficiency can be increased by 10% to 30%.

The color conversion layer 12 further includes a sealant layer 122, the sealant layer 122 at least partially covers the light-emitting element 11, and the phosphor 121 is uniformly dispersed in the sealant layer 122.

A material of the sealant layer 122 may be pressure sensitive adhesive (PSA), ultraviolet ray (UV) curing adhesive, or the like.

The reflective sheet 13 is adjacent to the light-emitting element 11, and the reflective sheet 13 is used to reflect the blue light irradiated on the reflective sheet 13 to reduce the loss of blue light.

The bottom plate 14 is used to drive the light-emitting element 11 to emit blue light, and the light-emitting element 11 and the reflective sheet 13 are both formed on the bottom plate 14. In an optional embodiment of the present disclosure, the bottom plate 14 is a circuit board, and the light-emitting element 11 is electrically connected to the bottom plate 14. In another embodiment of the present disclosure, the bottom plate 14 may also be a bottom plate or a substrate containing a circuit board.

In an optional embodiment of the present disclosure, the backlight module 110 may further include a diffuser plate 15, and the diffuser plate 15 is located on a side of a light-exiting surface of the light-emitting element 11. The quantum dot polarizer 20 faces the diffuser plate 15.

In other embodiments, the backlight module 110 may not include the diffuser plate 15. Of course, this can only be achieved under the premise that the quantum dot polarizer 20 includes a layer with light diffusing particles.

In this embodiment, the display panel 120 includes a display panel main body 30 and a quantum dot polarizer 20, and the quantum dot polarizer 20 is disposed on a surface of the display panel main body 30 facing the backlight module 110.

The quantum dot polarizer 20 includes a core layer 21, a polarizer 22, and a quantum dot layer 23. The polarizer 22 and the quantum dot layer 23 are located on opposite sides of the core layer 21. Specifically, the polarizer 22 is attached to a surface of the core layer 21 through a first adhesive layer 24, and the quantum dot layer 23 is attached to another surface of the core layer 21 through a second adhesive layer 25. The quantum dot layer 23 faces the backlight module 110.

In an optional embodiment of the present disclosure, a material of the core layer 21 includes cellulose triacetate.

In an optional embodiment of the present disclosure, the polarizer 22 is an iodine-based polarizer film or a dye-based polarizer film; and a material of the polarizer 22 includes polyvinyl alcohol.

The quantum dot layer 23 is a film material containing quantum dots, which can be a quantum dot film obtained by mixing quantum dots with other materials through a film forming process, or a quantum dot film prepared from quantum dots alone.

Specifically, the quantum dots in the quantum dot layer 23 may be a mixture of one or more types. Preferably, the quantum dots in the quantum dot layer 23 are a combination of quantum dots of various types, for example, quantum dots emitting red light and quantum dots emitting green light, to achieve a better color gamut improvement effect and mixing effect.

Specifically, the red light material of the quantum dots in the quantum dot layer 23 includes one or more of CdSe, Cd2SeTe, InAs, etc.; and the green light material of the quantum dots in the quantum dot layer 23 includes one or more of ZnCdSe2, InP, Cd2SSe, etc.

Specifically, the quantum dots may be quantum dots modified by a surface grafting method or a surface coating method, so as to achieve a more uniform and stable mixing effect in a solvent.

Specifically, the quantum dots are oil-soluble or water-soluble.

Preferably, the quantum dots are nanoparticles with a diameter of 0-20 nm.

Specifically, the film forming process of the quantum dot layer 23 is a process such as spray coating, spin coating, printing, or slit coating.

Specifically, when light is emitted from the light-emitting element 11, excitation light with a narrower half-height width is excited after the light passes through the quantum dot layer 23, so that a color gamut range of the display device can be increased and the picture quality can be improved. This is because the quantum dot itself has an ability to convert light, and when the quantum dot is excited by blue light, an electron transition occurs, followed by completing electron-hole recombination in a form of fluorescent radiation. As a typical zero-dimensional nanomaterial, the quantum dots have sizes within a quantum confinement range in all directions, so that their fluorescent radiations have no direction selectivity, and after the quantum dots are excited, they can radiate fluorescence at 360° without difference, which can effectively balance brightness of each viewing angle of a liquid crystal display.

The quantum dot polarizer 20 can be used as a lower polarizer of a liquid crystal display panel. Since the quantum dots in the quantum dot layer 23 have light-emitting characteristics, it can play a role in increasing a color gamut coverage. The quantum dot polarizer 20 not only ensures the polarization, but also can effectively improve the color gamut coverage of the display device 100, and meanwhile can also realize a wide viewing angle of the display device 100, as well as a simple manufacturing process.

The display panel main body 30 includes a first substrate (not shown), a second substrate (not shown), and a liquid crystal layer located between the first substrate and the second substrate. The first substrate is an array substrate, the second substrate is a color filter substrate, and the polarizer 22 is formed on a surface of the first substrate close to the backlight module 110.

A second quantum dot layer (not shown) may be formed on the first substrate of the display panel 120, and the second quantum dot layer is located between the first substrate and the polarizer 22. A structure and material of the second quantum dot layer are the same as a structure and material of the first quantum dot layer 23. The second quantum dot layer can further improve the color gamut coverage of the display device 100, and meanwhile can realize the wide viewing angle of the display device 100.

In other embodiments, the quantum dot layer 23 and the polarizer 22 may not be combined together, and the quantum dot layer 23 is directly formed on a surface of a side of the display panel 120 facing the backlight module 110.

The quantum dot display device 100 may further include an upper polarizer (not shown), and the upper polarizer is formed on a surface of the second substrate away from the first substrate.

Figure 3:
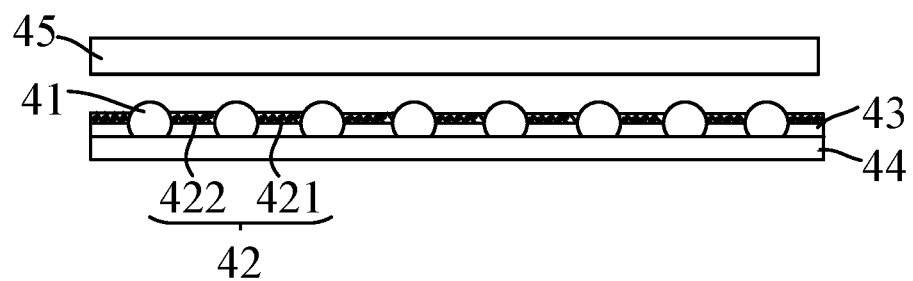
FIG. 3 is a schematic diagram of a backlight module provided by Embodiment 2 of the present disclosure.

Referring to FIGS. 1 and 3, Embodiment 2 of the present disclosure provides a quantum dot display device 200 and a backlight module 210. A structure of the quantum dot display device 200 is similar to that of the quantum dot display device 100 except that the backlight module 210 in the quantum dot display device 200 is different from the backlight module 110 in the quantum dot display device 100.

The backlight module 210 includes at least one light-emitting element 41, at least one color conversion layer 42, a reflective sheet 43, and a bottom plate 44. The reflective sheet 43 is located on one side of the light-emitting element 41, and both the light-emitting element 41 and the reflective sheet 43 are formed on the bottom plate 44.

The light-emitting element 41 is a blue light-emitting element. In an optional embodiment of the present disclosure, the light-emitting element 41 is a blue-backlight light-emitting diode.

In Embodiment 2 of the present disclosure, the color conversion layer 42 is formed on the reflective sheet 43, and the color conversion layer 42 includes a small amount of phosphors 421, and the phosphors 421 emit red light, green light, or yellow light under excitation of blue light when excited by blue light. In other words, the phosphor 421 may be at least one of red phosphor, green phosphor, or yellow phosphor. Specifically, a material of the phosphor 121 may be at least one of a rare earth phosphor such as yttrium aluminum garnet (YAG) or a calcium halophosphate phosphor activated by antimony and manganese.

In Embodiment 2 of the present disclosure, a weight percentage of the phosphors 421 in the color conversion layer 42 is 0.05 wt % to 0.5 wt %.

The color conversion layer 42 is patterned. The phosphor 421 in the color conversion layer 42 is excited by light reflected by the reflective sheet 43 to emit red light, green light, or yellow light, where the excitation is performed during a light reflection process.

The reflective sheet 43 is used to reflect the blue light irradiated on the reflective sheet 43 to reduce the loss of blue light.

The bottom plate 44 is used to drive the light-emitting element 41 to emit blue light.

The backlight module 210 may further include a diffuser plate 45, and the diffuser plate 45 is located above the light-emitting element 41 and in the light-exiting direction of the light-emitting element 41. The quantum dot polarizer 20 faces the diffuser plate 45. In other embodiments, the backlight module 210 may not include the diffuser plate 45.

Of course, in other embodiments, the color conversion layer 42 may be formed on the light-emitting element 41 and the reflective sheet 43 at the same time.

Figure 4:
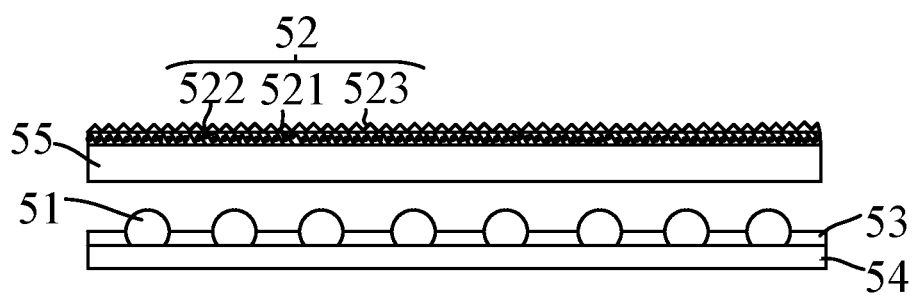
FIG. 4 is a schematic diagram of a backlight module provided by Embodiment 3 of the present disclosure.

Referring to FIGS. 1 and 4, Embodiment 3 of the present disclosure provides a quantum dot display device 300 and a backlight module 310. A structure of the quantum dot display device 300 is similar to that of the quantum dot display device 100, except that the backlight module 310 in the quantum dot display device 200 is different from the backlight module 110 in the quantum dot display device 100.

The backlight module 310 includes at least one light-emitting element 51, at least one color conversion layer 52, a reflective sheet 53, a bottom plate 54, and a diffuser plate 55. The reflective sheet 53 is adjacent to the light-emitting element 51, the light-emitting element 51 and the reflective sheet 53 are both formed on the bottom plate 54, and the diffuser plate 55 is located on a side of a light-exiting surface of the light-emitting element 51.

The light-emitting element 51 is a blue light-emitting element. In an optional embodiment of the present disclosure, the light-emitting element 51 is a blue-backlight light-emitting diode.

In Embodiment 3 of the present disclosure, the color conversion layer 52 is formed on the diffuser plate 55, and the color conversion layer 52 includes a small amount of phosphors 521, and the phosphors 521 emit red light, green light, or yellow light when excited by blue light. In other words, the phosphor 521 may be at least one of red phosphor, green phosphor, or yellow phosphor. Specifically, a material of the phosphor 121 may be at least one of a rare earth phosphor such as yttrium aluminum garnet (YAG) or a calcium halophosphate phosphor activated by antimony and manganese.

In Embodiment 3 of the present disclosure, a weight percentage of the phosphors 521 in the color conversion layer 52 is 0.05 wt % to 0.5 wt %.

A surface of the color conversion layer 52 facing the display panel 120 is patterned to form a pattern, which can increase a light output rate. The phosphor 521 in the color conversion layer 52 is excited by light reflected by the reflective sheet 53 to emit red light, green light, or yellow light during a light reflection process.

A plurality of protrusions 523 are formed on a surface of a side of the color conversion layer 52 away from the light-emitting element 51, and the protrusions 523 can increase a diffusion range of light.

After the light emitted by the light-emitting element 51 is diffused through the diffuser plate 55, a majority of the light passes through the diffuser plate 55 and enters the quantum dot polarizer 20, and a minority of the light passes through the diffuser plate 55 and irradiates the phosphors 521 in the color conversion layer 52, so that the phosphors 521 emit red light, green light, or yellow light.

The reflective sheet 53 is used to reflect the blue light irradiated on the reflective sheet 53 to reduce the loss of blue light.

Figure 5:
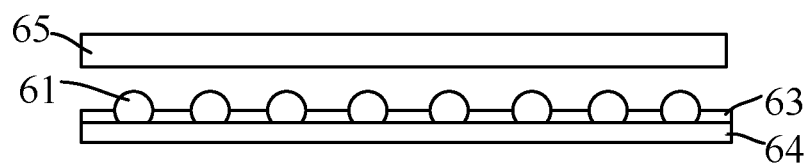
FIG. 5 is a schematic diagram of a backlight module provided by Embodiment 4 of the present disclosure.

Referring to FIG. 1 and FIG. 5, Embodiment 4 of the present disclosure provides a quantum dot display device 400 and a backlight module 410. A structure of the quantum dot display device 400 is similar to that of the quantum dot display device 100, except that the backlight module 410 in the quantum dot display device 400 is different from the backlight module 110 in the quantum dot display device 100.

The backlight module 410 includes at least one light-emitting element 61, a reflective sheet 63, a bottom plate 64, and a diffuser plate 65. The reflective sheet 63 is located on one side of the light-emitting element 61, the light-emitting element 61 and the reflective sheet 63 are both formed on the bottom plate 64, and the light-emitting element 61 is electrically connected to the bottom plate 64. The diffuser plate 65 is located above the light-emitting element 61 and in the light-exiting direction of the light-emitting element 61.

The light-emitting element 61 is a blue light-emitting element. In an optional embodiment of the present disclosure, the light-emitting element 61 is a blue-backlight light-emitting diode. The reflective sheet 63 is used to reflect the blue light irradiated on the reflective sheet 63 to reduce the loss of blue light.

The diffuser plate 65 is a transparent diffuser plate. Preferably, a transmittance of the diffuser plate is greater than 90%. Setting the diffuser plate 65 of the backlight module 410 as a transparent diffuser plate can increase transmittance of the backlight, thereby reducing the loss of the backlight, and improving the energy efficiency of the light-emitting element. In the present disclosure, the energy efficiency can be increased by 10% to 30%.

Of course, in other embodiments, the backlight modules 110, 210, 310, and 410, either alone or in combination, can be applied to two liquid crystal display modes, VA and IPS. In other words, the color conversion layer may be formed on any two or three of the light-emitting elements, the reflective sheet, and the diffuser plate at the same time. In addition, it is feasible to include a color conversion layer while setting the diffuser plate as a transparent diffuser plate, and the color conversion layer may be provided on at least one of the light-emitting element, the reflective sheet, or the diffuser plate.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A backlight module, comprising:
   a light-emitting element which emits blue light;
   a color conversion layer comprising a phosphor, wherein the phosphor emits at least one of red light, green light, or yellow light under excitation of the blue light;
   a diffuser plate located on a side of a light-exiting surface of the light-emitting element; and
   a plurality of protrusions located on a side of the diffuser plate away from the light-emitting element:,
   wherein the color conversion layer is formed on a surface of the diffuser plate and is located on a side of the diffuser plate away from the light-emitting element, and the plurality of protrusions are formed on a surface of the color conversion layer away from the diffuser plate.

2. The backlight module according to claim 1, wherein a weight percentage of the phosphor in the color conversion layer is 0.05 wt % to 0.5 wt %.

3. The backlight module according to claim 1, wherein the phosphor is made of a material comprising a rare earth phosphor or a calcium halophosphate phosphor activated by antimony and manganese.

4. The backlight module according to claim 1, wherein the diffuser plate is a transparent diffuser plate with a transmittance greater than 90%.

5. A quantum dot display device, comprising:
   a backlight module, comprising:
   a light-emitting element which emits blue light;
   a color conversion layer comprising a phosphor, wherein the phosphor emits at least one of red light, green light, or yellow light under excitation of the blue light;
   a diffuser plate located on a side of a light-exiting surface of the light-emitting element; and
   a plurality of protrusions located on a side of the diffuser plate away from the light-emitting element; and
   a display panel located on a side of a light-exiting surface of the backlight module, wherein the display panel comprises a quantum dot layer;
   wherein the color conversion layer is formed on a surface of the diffuser plate and is located on a side of the diffuser plate away from the light-emitting element, and the plurality of protrusions are formed on a surface of the color conversion layer away from the diffuser plate.

6. The quantum dot display device according to claim 5, wherein the display panel further comprises a polarizer, and the quantum dot layer is formed on the polarizer.

7. The quantum dot display device according to claim 5, wherein a weight percentage of the phosphor in the color conversion layer is 0.05 wt % to 0.5 wt %.

8. The quantum dot display device according to claim 5, wherein the phosphor is made of a material comprising a rare earth phosphor or a calcium halophosphate phosphor activated by antimony and manganese.

9. The quantum dot display device according to claim 5, wherein the diffuser plate is a transparent diffuser plate with a transmittance greater than 90%.

10. A backlight module, comprising:
   a light-emitting element which emits blue light; and
   a color conversion layer comprising a phosphor, wherein the phosphor emits at least one of red light, green light, or yellow light under excitation of the blue light;
   a substrate, wherein the light-emitting element is formed on the substrate; and
   a reflective sheet located on an upper surface of the substrate and adjacent to the light-emitting element;
   wherein the color conversion layer is located on a surface of the reflective sheet away from the substrate.

\* \* \* \* \*